(12) United States Patent
Park

(10) Patent No.: US 9,841,634 B2
(45) Date of Patent: Dec. 12, 2017

(54) THREE DIMENSIONAL DISPLAY APPARATUS AND MANUFACTURING METHOD THEREOF

(71) Applicant: SAMSUNG ELECTRONICS CO., LTD., Suwon-si (KR)

(72) Inventor: Jae Hyun Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 136 days.

(21) Appl. No.: 14/575,299

(22) Filed: Dec. 18, 2014

(65) Prior Publication Data

US 2015/0177541 A1    Jun. 25, 2015

(30) Foreign Application Priority Data

Dec. 19, 2013  (KR) .................. 10-2013-0159533

(51) Int. Cl.
  *G02F 1/1333* (2006.01)
  *G02F 1/1339* (2006.01)
  (Continued)

(52) U.S. Cl.
  CPC ......... *G02F 1/1339* (2013.01); *G02B 27/225* (2013.01); *G02B 27/2228* (2013.01);
  (Continued)

(58) Field of Classification Search
  CPC ... G02F 2001/133317; G02F 1/133308; G02F 2001/133314; G02F 2001/13332
  See application file for complete search history.

(56) References Cited

U.S. PATENT DOCUMENTS 8,305,743 B2 * 11/2012 Wu ................. G02F 1/133305
                                                    174/254
2005/0146787 A1 * 7/2005 Lukyanitsa ........ G02B 27/2214
                                                    359/462
(Continued)

FOREIGN PATENT DOCUMENTS

CN       1294695 A       5/2001
CN       1678942 A      10/2005
(Continued)

OTHER PUBLICATIONS

Communication dated Feb. 16, 2015 by the International Searching Authority in related application No. PCT/KR2014/012452.
(Continued)

*Primary Examiner* — Nathanael R Briggs
*Assistant Examiner* — Alexander Gross
(74) *Attorney, Agent, or Firm* — Sughrue Mion, PLLC

(57) ABSTRACT

A three-dimensional (3D) display apparatus, display module, and a manufacturing method thereof, are provided. The 3D display apparatus includes a display module including a first display panel configured to display a two-dimensional (2D) image, a second display panel disposed in front of the first display panel and spaced apart from the first display panel, and configured to display another 2D image that when combined with the 2D image displayed by the first display panel generates a 3D image, and a spacing panel comprising a rear surface on which the first display panel is attached and a front surface on which the second display panel is attached, the spacing panel providing an amount of space between the first display panel and the second display panel.

19 Claims, 7 Drawing Sheets

(51) Int. Cl.
*G02F 1/1347* (2006.01)
*G02B 27/22* (2006.01)
*H04N 13/04* (2006.01)
*G02F 1/1335* (2006.01)

(52) U.S. Cl.
CPC ....... *G02B 27/2278* (2013.01); *G02F 1/1347* (2013.01); *G02F 1/133305* (2013.01); *G02F 1/133308* (2013.01); *G02F 1/133603* (2013.01); *G02F 1/133606* (2013.01); *G02F 1/133608* (2013.01); *H04N 13/0402* (2013.01); *H04N 13/0495* (2013.01); *G02F 2001/13332* (2013.01); *G02F 2001/133314* (2013.01); *G02F 2001/133317* (2013.01); *H04N 2213/001* (2013.01)

(56) References Cited

U.S. PATENT DOCUMENTS

| | | | |
|---|---|---|---|
| 2007/0009222 A1 | 1/2007 | Koo et al. | |
| 2008/0094545 A1* | 4/2008 | Ko | G02B 27/26 349/96 |
| 2009/0096957 A1* | 4/2009 | Hiyama | G02B 6/003 349/65 |
| 2009/0174827 A1 | 7/2009 | Kim et al. | |
| 2010/0308199 A1* | 12/2010 | Maloney | G09F 15/0025 248/488 |
| 2015/0042920 A1* | 2/2015 | Lee | G02F 1/1336 349/60 |

FOREIGN PATENT DOCUMENTS

| | | |
|---|---|---|
| CN | 101349817 A | 1/2009 |
| EP | 1607788 A1 | 12/2005 |
| EP | 2535765 A2 | 12/2012 |
| EP | 2664957 A1 | 11/2013 |
| EP | 2667247 A1 | 11/2013 |
| JP | 2003280548 A | 10/2003 |
| JP | 2009115933 A | 5/2009 |
| KR | 1020100049020 | 5/2010 |
| KR | 1020110100537 | 9/2011 |
| KR | 1020120123824 | 11/2012 |

OTHER PUBLICATIONS

Communication dated Apr. 9, 2015 by the European Patent Office in related application No. 14197961.7.
Lanman, Douglas et al., "HR3D: Glasses-free 3D Display using Dual-stacked LCDs", AMC Transactions on Graphics, vol. 29, No. 6, Dec. 1, 2010, total 12 pages, Cited in comm. dated Apr. 9, 2015 in related application No. 14197961.7.
Communication dated Jan. 17, 2017, issued by the European Patent Office in counterpart European Application No. 14197961.7.
Communication dated Jul. 18, 2017, issued by the State Intellectual Property Office of People's Republic of China in counterpart Application No. 201410785600.3.
Communication dated Aug. 25, 2017, issued by the European Patent Office in counterpart European Application No. 14197961.7.

* cited by examiner

THREE DIMENSIONAL DISPLAY APPARATUS AND MANUFACTURING METHOD THEREOF

CROSS-REFERENCE TO RELATED APPLICATION(S)

This application claims priority from Korean Patent Application No. 10-2013-0159533, filed on Dec. 19, 2013 in the Korean Intellectual Property Office, the entire disclosure of which is incorporated herein by reference.

BACKGROUND

1. Field

Apparatuses and methods consistent with exemplary embodiments relate to a three-dimensional (3D) display apparatus for displaying 3D images, and a manufacturing method thereof.

2. Description of Related Art

Stereoscopic imaging is the ability of a display to create depth in an image causing a user viewing the image to experience the image in three dimensions such as in real life. Typically, stereoscopy creates the illusion of three-dimensional images from a plurality of two-dimensional images. To generate the stereoscopic effect, each eye of a user receives a slightly different image thereby causing the user to experience the three-dimensional effect.

In general, a 3D display apparatus includes a display panel on which images are displayed. Typically three-dimensional displays require the use of polarization glasses or shutter glasses which are used to restrict an image from being seen simultaneously by both eyes at the same time, but instead enables the image to be seen by only one eye at any given time by blocking the image to the other eye.

Due to a fast refresh rate of the display, such as a refresh rate of 120 hertz (Hz), the brain of the user does not realize only one eye is viewing the image at a time but instead a user feels as if both eyes are constantly receiving the image. This type of restriction on one eye at a time creates a stereoscopic effect causing a user to feel as if an image is being projected in three-dimensions instead of two-dimensions.

Recently, 3D display apparatuses have been developed which do not require the use of polarization glasses. For example, a 3D display apparatus has been developed in which a first display panel of displaying a first image and a second display panel of displaying a second image having a difference in an angle of view from the first image are moved in a back-and-forth direction at a very fast rate causing a user to sense a 3D image without wearing 3D glasses by seeing the first image and the second image at the same time.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

According to one or more exemplary embodiments, there is provided a 3D display apparatus that is curved such that both sides protrude forward.

According to an aspect of an exemplary embodiment, there is provided a 3D display apparatus including a display module including a first display panel configured to display a two-dimensional (2D) image, a second display panel disposed in front of the first display panel and spaced apart from the first display panel, and configured to display another 2D image that when combined with the 2D image displayed by the first display panel generates a 3D image, and a spacing panel including a rear surface on which the first display panel is attached and a front surface on which the second display panel is attached, the spacing panel providing an amount of space between the first display panel and the second display panel.

The spacing panel may be configured to bend while the first display panel and the second panel are attached on the rear and front surfaces such that both sides of the spacing panel protrude forward and the first and second display panels are also bent without the first and second panels receiving an external contact.

The spacing panel may have a uniform thickness throughout the entire area between the first and second display panels.

The spacing panel may include a single material.

The spacing panel may include a transparent material.

The first display panel and the second display panel may be liquid crystal display (LCD) panels.

Edges of the spacing panel may protrude therefrom while the first display panel and the second display panel are attached thereto, and the 3D display apparatus may further include a main frame curved such that both sides of the main frame protrude forward, and the main frame may support the edges of the spacing panel.

The main frame may include a resting groove formed in a front part of an inner side of the main frame and configured so that the edges of the spacing panel may be rested in and supported by the resting groove.

The 3D display apparatus may further include a case installed on the main frame and configured to cover the edges of the spacing panel and edges of the second display panel.

The case may further include an elastic member disposed on the inner side of the case and configured to elastically support front edges of the spacing panel.

The 3D display apparatus may further include a backlight module curved such that both sides of the backlight module protrude forward, and the backlight module may be disposed behind the display module to supply light to the display module.

The backlight module may include a light source, a diffuser plate disposed in front of the light source, a backlight frame configured to support the light source and the diffuser plate, a support bracket installed in the backlight frame and configured to support edges of the diffuser plate so that the diffuser plate is fixedly installed in the backlight frame, and a rear chassis configured to cover a rear surface of the backlight frame.

The light source may include a plurality of light emitting diodes (LEDs) and a substrate on which the plurality of LEDs are mounted.

According to an aspect of another exemplary embodiment, there is provided a method of manufacturing a three-dimensional (3D) display apparatus, the method including attaching a first display panel to a rear surface of a spacing panel; attaching a second display panel to a front surface of the spacing panel; and bending the spacing panel on which the first display panel and the second display panel are attached without contacting the first and second display panels with an external force, causing the first display panel and the second display panel to bend according to the bending of the spacing panel.

Edges of the spacing panel may protrude from between the first display panel and the second display panel, and the bending may further include bending the spacing panel by causing the edges of the spacing panel to be supported by a main frame curved such that both sides of the main frame protrude forward.

The method may further include installing a case in the main frame, where the case is curved such that both sides of the case protrude forward and edges of the spacing panel and edges of the second display panel are covered by the case.

The method may further include installing an elastic member on an inner side of the case, where the elastic member may elastically support front edges of the spacing panel when the case is installed on the main frame to maintain the spacing panel in the bent state.

BRIEF DESCRIPTION OF THE DRAWINGS

The above and/or other aspects will become apparent and more readily appreciated from the following description of exemplary embodiments, taken in conjunction with the accompanying drawings of which.

DETAILED DESCRIPTION

Figure 1:
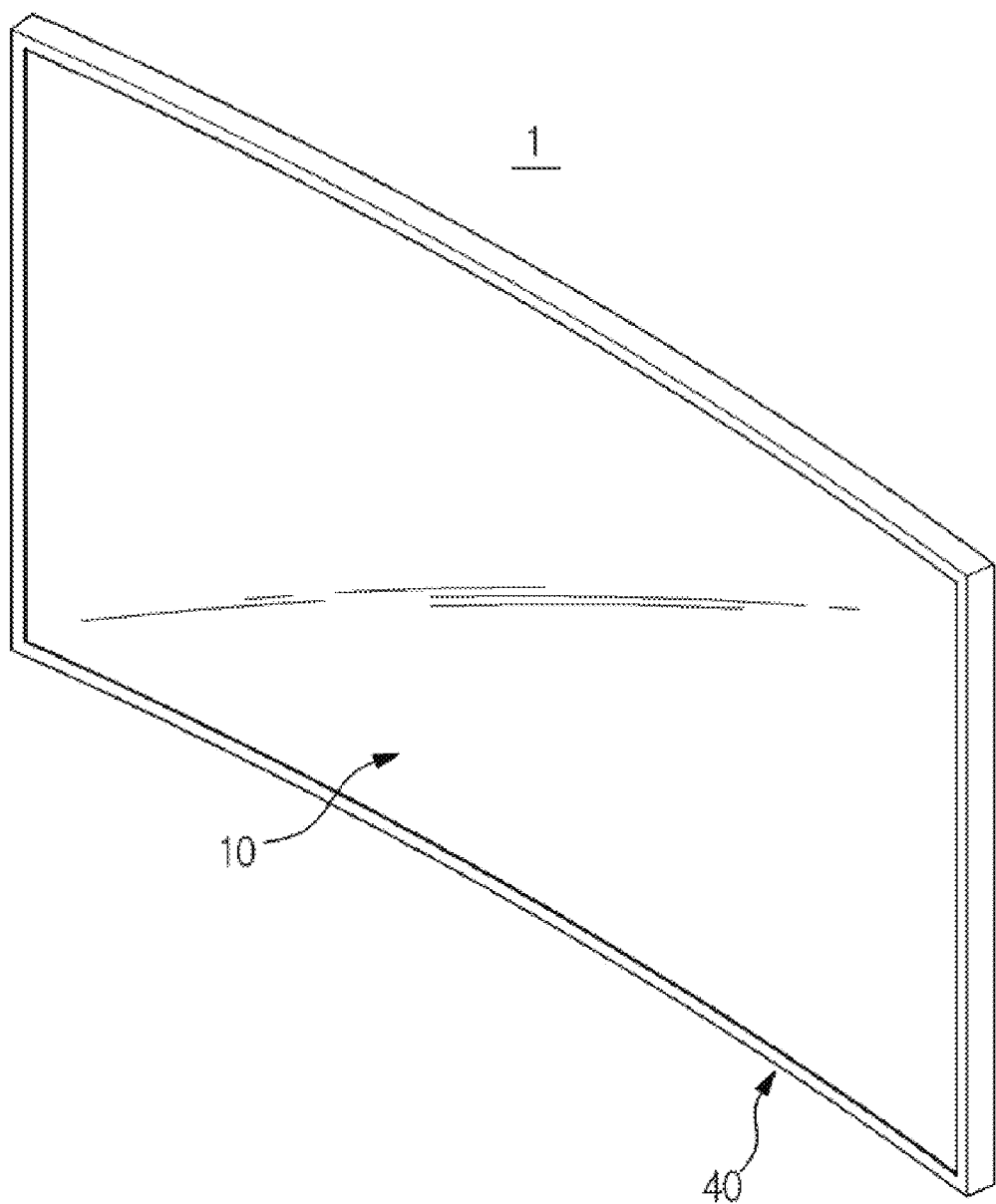
FIG. 1 is a perspective diagram of a 3D display apparatus according to an exemplary embodiment.

Exemplary embodiments will now be described in detail with reference to the accompanying drawings, wherein like reference numerals refer to like elements throughout. The drawings may not be to scale, and the relative size, proportions, and depiction of elements in the drawings may be exaggerated for clarity, illustration, and convenience.

The following detailed description is provided to assist the reader in gaining a comprehensive understanding of the methods, apparatuses, and/or systems described herein. However, various changes, modifications, and equivalents of the methods, apparatuses and/or systems described herein will be apparent to one of ordinary skill in the art. The progression of processing steps and/or operations described is an example; however, the sequence of and/or operations are not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

One or more exemplary embodiments related to a (3D) display apparatus will be described with reference to the accompanying drawings. For example, the 3D display apparatus may be included in a television, a tablet, a mobile phone, an appliance, a kiosk, a computer, a notebook computer, a computer monitor, and the like.

Figure 2:
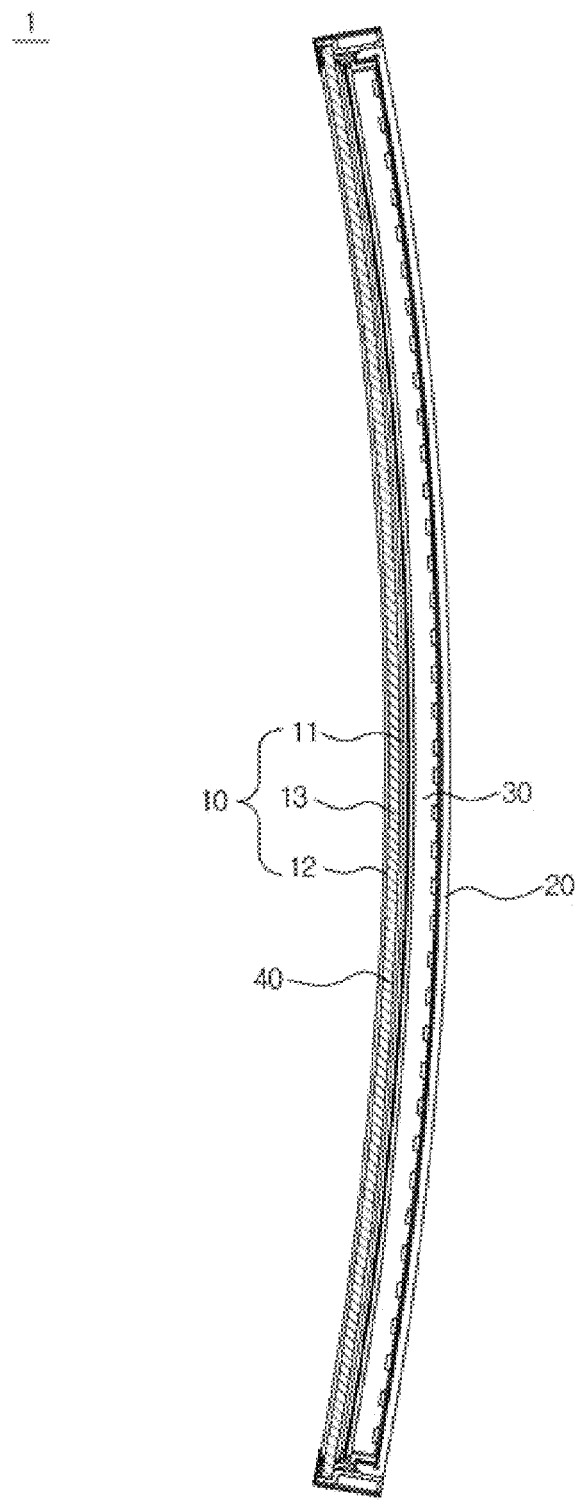
FIG. 2 is a plan view diagram of an interior of a 3D display apparatus according to an exemplary embodiment.

FIG. 1 is a perspective view of a 3D display apparatus according to an exemplary embodiment, and FIG. 2 is a plan view of an interior of a 3D display apparatus according to an exemplary embodiment As shown in FIGS. 1 and 2, a 3D display apparatus 1 according to an exemplary embodiment may be curved such that both sides of the 3D display apparatus 1 protrude forward with respect to the center of the 3D display apparatus 1. For example, the curve may have a range of curve and is not limited to the amount of curve shown in FIGS. 1 and 2. For example, the curve may be a slight curve, or it may be a more pronounced curve according to one or more exemplary embodiments. Also, as shown in FIG. the plan view of FIG. 2, the curve may constant throughout the entire area of the display. As another example, the ends of the display may be curved only, the interior section of the display may be curved only, and the like In this example, the 3D display apparatus 1 includes a display module 10 that may display an image such as a 2D image, a 3D image, and the like, a backlight module 20 that is disposed behind the display module 10 and configured to supply light to the display module 10, a main frame 30 configured to accommodate and support the display module 10 and the backlight module 20 therein, and a case 40 that is installed around the main frame 30 and forms an external portion of the display module 10 of the 3D display apparatus 1.

According to various exemplary embodiments, the display module 10 may be installed in the main frame 30, and may be bent and/or curved such that both sides or ends of the display module protrude forward in a curved fashion.

Figure 3:
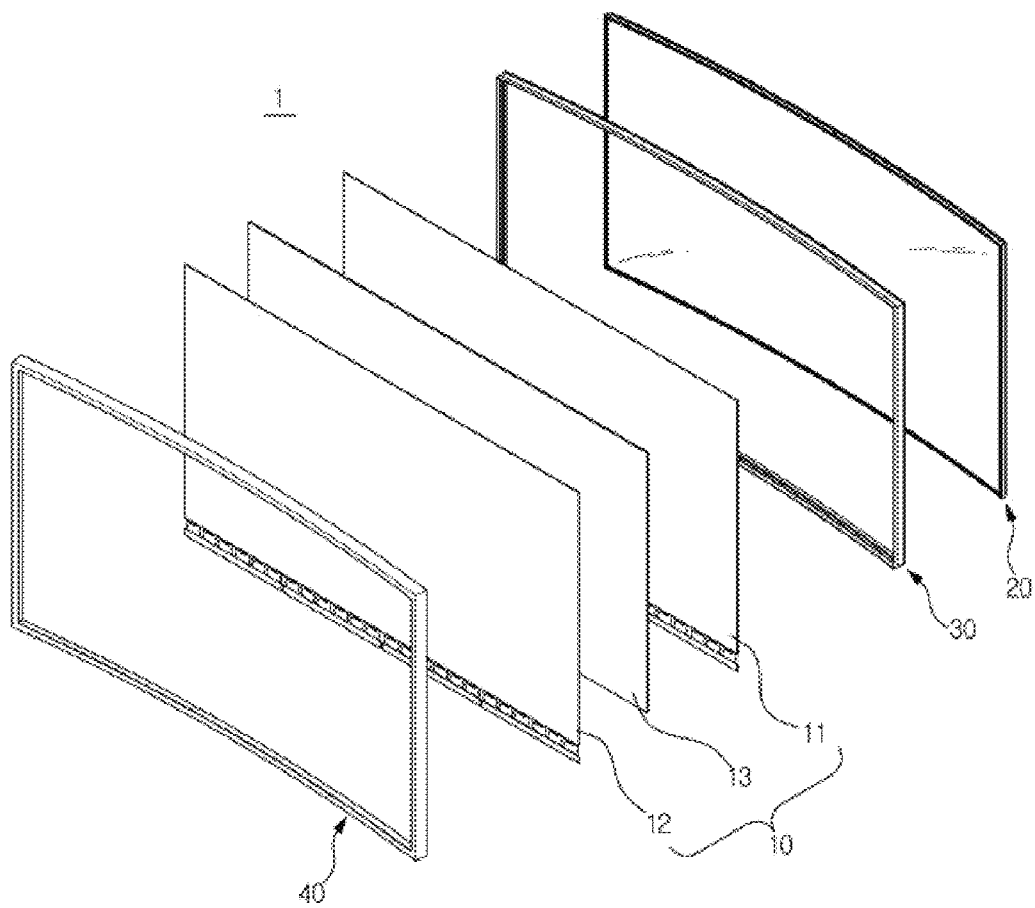
FIG. 3 is an exploded perspective diagram of a 3D display apparatus according to an exemplary embodiment.

FIG. 3 is an exploded perspective diagram of a 3D display apparatus according to an exemplary embodiment.

Referring to FIGS. 2 and 3, the display module 10 may include a first display panel 11 that may display a 2D image and a second display panel 12 disposed in front of the first display panel 11 that may display a 3D image together with the first display panel 11. In this example, the display module 10 further includes a spacing panel 13 interposed between the first display panel 11 and the second display panel 12 to maintain a spacing between the first display panel 11 and the second display panel 12.

For example, display panel 11 may display a first 2D image of an object at a first angle, and display panel 12 may simultaneously display a second 2D image of the object at a second angle creating a 3D image from a user viewpoint.

As an example, the first display panel 11 may display a first 2D image, and the second display panel 12 may display a second 2D image that has a difference in an angle of view from the first 2D image displayed by the first display panel 11 such that a user experiences an image displayed on the 3D display apparatus 1 as a 3D image by simultaneously viewing the first 2D image and the second 2D image that have a difference in an angle of view.

As a non-limiting example, the first display panel 11 and the second display panel 12 may be liquid crystal display (LCD) panels that are in the shape of, for example rectangular plates that have sizes that correspond to each other.

As another example, the spacing panel 13 may be implemented in the shape of a rectangular plate that has a width and a height that are greater than those of the first display panel 11 and the second display panel 12, such that the edges of the spacing panel 13 protrude from between the first display panel 11 and the second display panel 12, however, the size of the spacing panel 13 is not limited thereto. For example, the spacing panel 13 may be the same size as or smaller than the first and second display panels 11 and 12. The spacing panel 13 may be made of a transparent material through which light can be transmitted. For example, the spacing panel 13 may be made of one or more of glass, plastic, transparent film, and the like. The spacing panel 13 may also be rigid, partially rigid, flexible, and the like.

While the examples herein describe the first and second display panels 11 and 12, and the spacing panel 13 as having the shape of a rectangle, it should be appreciated that the shape of the 3D display apparatus is not limited thereto. For example, the 3D display apparatus and its components may have a square shape, an elliptical shape, a circular shape, an octagonal shape, a pentagonal shape, or any other desired shape.

From back to front of the display module 10, in this example the first display panel 11 is attached to a rear surface of the spacing panel 13, and the second display panel 12 is attached to a front surface of the spacing panel 13. The first display panel 11 and the second display panel 12 may be attached on the spacing panel 13 with various optical bonding materials, for example, liquid optically clear adhesive (LOCA), and the like, to prevent optical loss at interfaces between the spacing panel 13 and the first and second display panels 11 and 12. As another example, the second display panel 12 may be attached to the rear surface of the spacing panel 13 and the first display panel 11 may be attached to the front surface of the spacing panel 13.

For example, the first and second display panels 11 and 12 may be adhered to the spacing panel 13 using an adhesive that has a similar or the same refractive index, for example, silicone, epoxy, acrylated urethane, a pressure sensitive adhesive (PSA), and the like, which may offer optimized mechanical and thermal properties.

In one or more exemplary embodiments, if the first display panel 11 and the second display panel 12 are respectively attached at both the rear and the front surfaces of the spacing panel 13, a spacing distance between the first display panel 11 and the second display panel 12 may be precisely maintained throughout the entire area thereof by the spacing panel 13 so that the first image and the second image have an exact difference or approximately an exact difference in angle of view throughout the entire area of the display module 10, thus, enabling a user to see a clear 3D image from any position on the screen without the use of polarizing shutter glasses.

Also, the spacing panel 13 may have a uniform thickness and be made of a single material that may be used to maintain a uniform stiffness throughout the entire area so that the spacing panel 13 can be uniformly bent, for example, when it is bent by an external force.

According to various aspects herein, the display module 10 may be bent such that both sides or ends thereof protrude forward at approximately the same distance. If the first display panel 11 and the second display panel 12 are liquid crystal panels, as described above, the respective first display panel 11 and the second display panel 12 may have a different or lack of stiffness or rigidity in one or more areas, for example, because of the liquid crystal design which includes part solid and part liquid matter.

In this example, if a force for bending the first display panel 11 and the second display panel 12 is applied directly to the first display panel 11 and the second display panel 12, the curvature of the bend of the first display panel 11 and the second display panel 12 may be different in some areas due to the lack of rigidity in the liquid crystals of the LCDs.

According to one or more exemplary embodiments, the spacing panel 13 may have a uniform thickness made of a single material that is more rigid than the first and second display panels 11 and 12, such that when the spacing panel 13 is bent by an external force, the first display panel 11 and the second display panel 12 that are attached to the spacing panel 13 may be bent according to the bending of the spacing panel 13 without being contacted by an external force.

Figure 4:
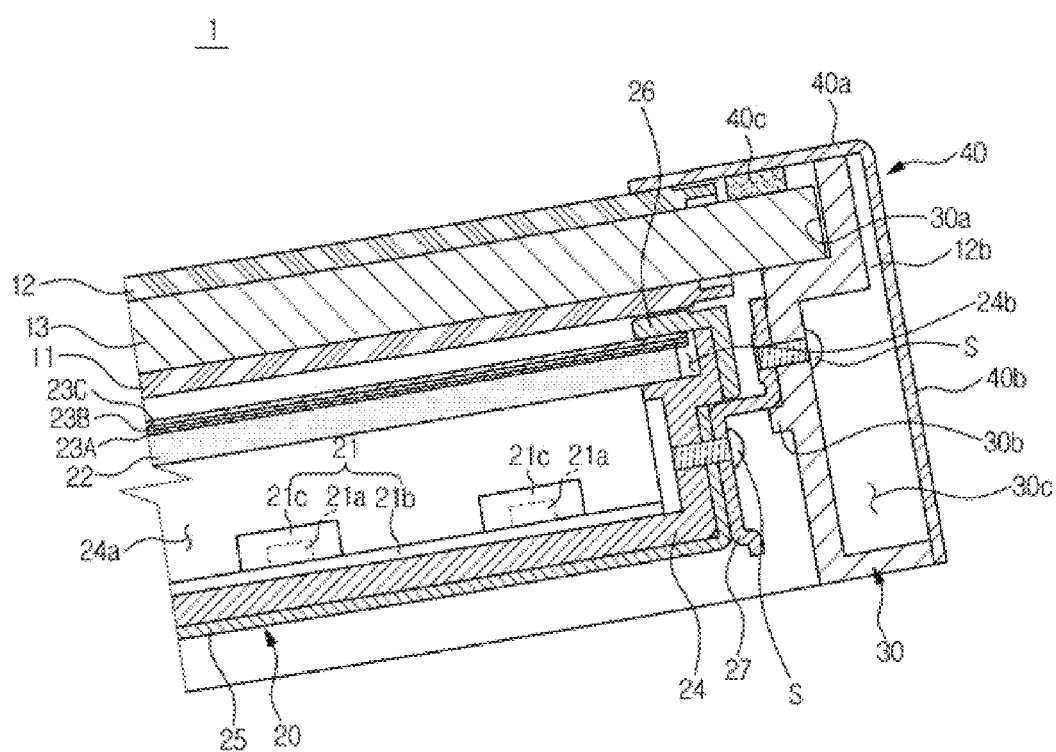
FIG. 4 is a partially enlarged, cross-sectional diagram of one side end of a 3D display apparatus according to an exemplary embodiment.

FIG. 4 is a partially enlarged, cross-sectional diagram of an interior side end of a 3D display apparatus according to an exemplary embodiment.

Referring to FIG. 4, the backlight module 20 may be curved such that both of its sides protrude forward to correspond to the curve of the display module 10. For example, the backlight module 20 may include a light source 21 to generate light, a diffuser plate 22 disposed in front of the light source 21 and used to diffuse light, a plurality of optical sheets 23A, 23B, and 23C disposed in front of the diffuser plate 22, a backlight frame 24 to support the light source 21 and the diffuser plate 22. The backlight module 20 may also include a rear chassis 25 disposed behind the backlight frame 24, a support bracket 26 disposed at an edge of a front part of the backlight frame 24 and which may be used to fix the diffuser plate 22 and the optical sheets 23A, 23B, and 23C to the backlight frame 24, and an installation bracket 27 that is installed on an outer surface of the rear chassis 25 and which is used to install the backlight module 20 within the main frame 30.

For example, the light source 21 may include a plurality of light emitting diodes (LEDs) 21a installed on the inside of the backlight frame 24, a substrate 21b on which the LEDs 21a are mounted, and a plurality of lenses 21c to diffuse light generated by the LEDs 21a. In this example, the LEDs 21a, the lenses 21c, and the substrate 21b are installed behind the diffuser plate 22 and face the rear of the diffuser plate 22. It should also be appreciated that the light source 21 is not limited to LEDs and may be another type of light source, for example, organic LEDs (OLEDs), active matrix OLEDs (AMOLEDs), and the like.

The diffuser plate 22 may be a transparent plate that has a predetermined thickness, and may be used to diffuse light that is generated from the light source 21.

As a non-limiting example, the plurality of optical sheets 23A, 23B, and 23C may include a diffuser sheet 23A that is used to again diffuse light that passes through the diffuser plate 22, a prism sheet 23B including a prism-shaped pattern that may concentrate light that is diffused by the diffuser sheet 23A vertically onto the display module 10 (e.g., the display panels 11 and 12 and the spacing panel 13) which are located in front of the optical sheets 23A-23C, and a protection sheet 23C disposed in front of the prism sheet 23B and which may protect the prism sheet 23B because a prism sheet can be sensitive to dust or scratches.

The backlight frame 24 may include a light source accommodating area 24a that accommodates the light source 21 therein, and a diffuser plate accommodating area 24b provided in front of the light source accommodating area 24a that accommodates the diffuser plate 22 therein.

For example, the rear chassis 25 may be made of or otherwise include a metal material for heat-dissipation, and may be disposed behind the backlight frame 24 to cover the light source accommodating area 24a.

As one example, the support bracket 26 may be formed to have an L-shaped section, be disposed at an edge or corner of the front part of the backlight frame 24, and support the edges of the diffuser plate 22 and the optical sheets 23A, 23B, and 23C that are disposed in front of the diffuser plate 22. Accordingly, the support bracket 26 may fixedly maintain the diffuser plate 22 and the optical sheets 23A, 23B, and 23C in the diffuser plate accommodating area 24b.

The installation bracket 27 may be fixed to the outer surface of the rear chassis 25, and may have a step that is caught by a catching jaw 30b of the main frame 30, an example of which is described later. Here, the catching jaw 30b protrudes outward enough to prevent the installation bracket from moving away from the display module 10. The installation bracket 27 may be fixed to the rear chassis 25 and the main frame 30 through a coupling member such as a screw denoted by 'S'. Accordingly, the installation bracket 27 may be used to fix the backlight module 20 to the main frame 30.

According to one or more exemplary embodiments, because the backlight module 20 is curved in such a way that both of its sides are capable of protruding or otherwise being curved forward, the substrate 21b of the light source 21, the diffuser plate 22, the backlight frame 24, the rear chassis 25, the support bracket 26, and the installation bracket 27, included in the backlight module 20, may also be curved in such a way that both of their sides protrude forward in a curved fashion.

In addition, the main frame 30 may be curved such that both of its sides protrude forward so as to support the bent display module 10. Likewise, the main frame 30 may be in the shape of a rectangular ring so that the backlight module 20 may be installed within the main frame 30 such as at the back of the main frame 30 and the display module 10 may be installed at the front of the main frame 30.

In the front part of an inner side of the main frame 30, a resting groove 30a may be formed in which the edges of the bent spacing panel 13 may rest inside of and be supported by. Similarly, in the back part of the inner side of the main frame 30, the installation bracket 27 may be caught and supported by the catching jaw 30b. Accordingly, at the back of the main frame 30, the backlight module 20 may be installed through the installation bracket 27 and the catching jaw 30b, and at the front of the main frame 30, the display module 10 may be installed through the resting groove 30a.

According to various exemplary aspects, the outer edges of the spacing panel 13 protruding from between the first display panel 11 and the second display panel 12 may be rested in and supported by the resting groove 30a of the main frame 30. Accordingly, a force applied to bend the display module 10 may only be applied to the spacing panel 13 without being applied directly to or without making direct contact with the first display panel 11 and the second display panel 12. In this example, the first display panel 11 and the second display panel 12 may be bent together along with the spacing panel 13 based solely on the bending force that is directly applied to the spacing panel 13.

For example, the first and second panels 11 and 12 may be adhered to the spacing panel 13. In this example, the spacing material may be made of a more rigid material, while the first and second panels 11 and 12 may be made of a less rigid material, such as liquid crystal. While the three panels are connected with each other, outer edges of the spacing panel 13 may protrude outward at least from left and right ends thereof, or from all four ends thereof. Accordingly, to bend all three panels 11, 12, and 13, only the protruding outer edges of the spacing panel 13 may be contacted to bend all three panels 11, 12, and 13. Thus, preventing damage to the less rigid first and second display panels 11 and 12, and maintaining a uniform thickness between the first and second panels 11 and 12.

According to another exemplary embodiment, the spacing panel 13 may be bent into a curved form prior to being connected to the first and second display panels 11 and 12. Then, subsequently, the first and second display panels 11 and 12 can be adhered to the rear and front of the spacing panel 13.

The case 40 may be in the shape of a rectangular ring, have an L-shaped section, and forming front edges on all four sides (up, down, left, and right) of the rectangular 3D display apparatus 1. For example, the case 40 may include a bezel part 40a to cover the edges of the spacing panel 13 and the edges of the second display panel 12, and a side part 40b to cover each of the four sides (up, down, left, and right) of the main frame 30. Also, the case 40 may be fixed to the main frame 30 through a coupling member such as a screw 'S'.

In some examples, the case 40 may include an elastic member 40c that is attached to an inner side of the bezel part 40a and that elastically supports the front edges of the spacing panel 13 that protrude while the spacing panel 13 is disposed between the first display panel 11 and the second display panel 12.

Hereinafter, an example of a method of manufacturing the 3D display apparatus 1, according to an exemplary embodiment is described with reference to the accompanying drawings.

First, the display module 10, the backlight module 20, the main frame 30, and the case 40 may be prepared or otherwise manufactured.

Figure 5:
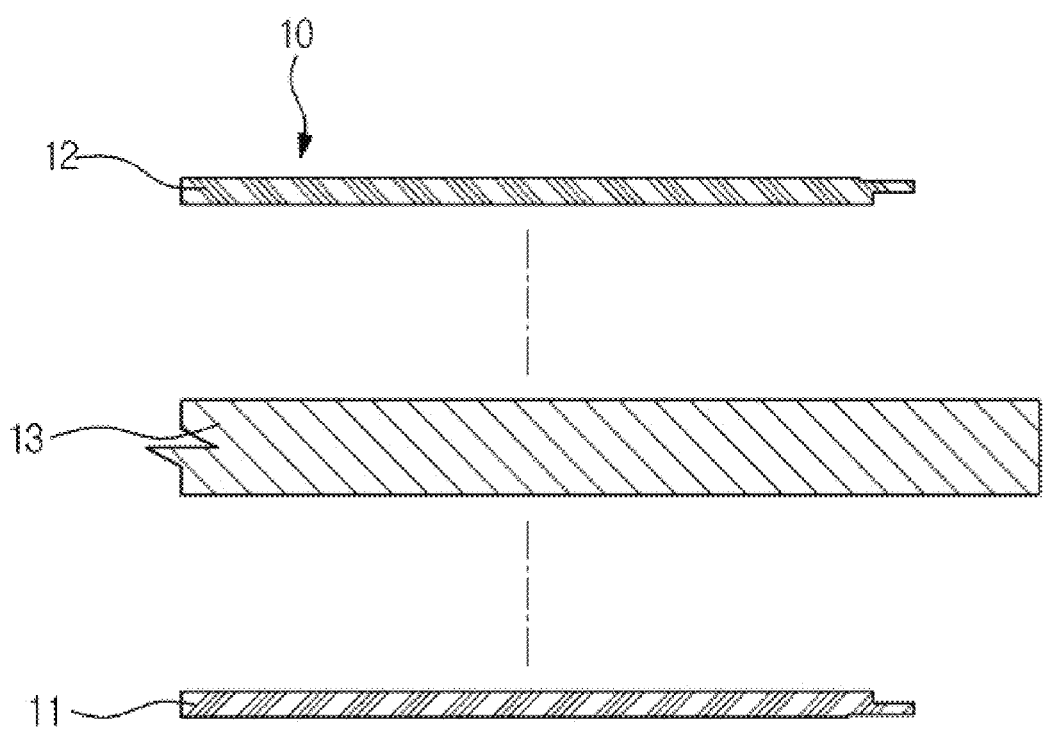
FIG. 5 is a cross-sectional diagram illustrating a manufacturing method of a display module of a 3D display apparatus according to an exemplary embodiment.

Referring to FIG. 5, the display module 10 may be fabricated by attaching the first display panel 11 to a rear surface of the spacing panel 13 which is in the shape of a flat plate, and attaching the second display panel 12 to the front surface of the spacing panel 13. For example, the first and second display panels 11 and 12 may be of the same size, or similar sizes.

Figure 6:
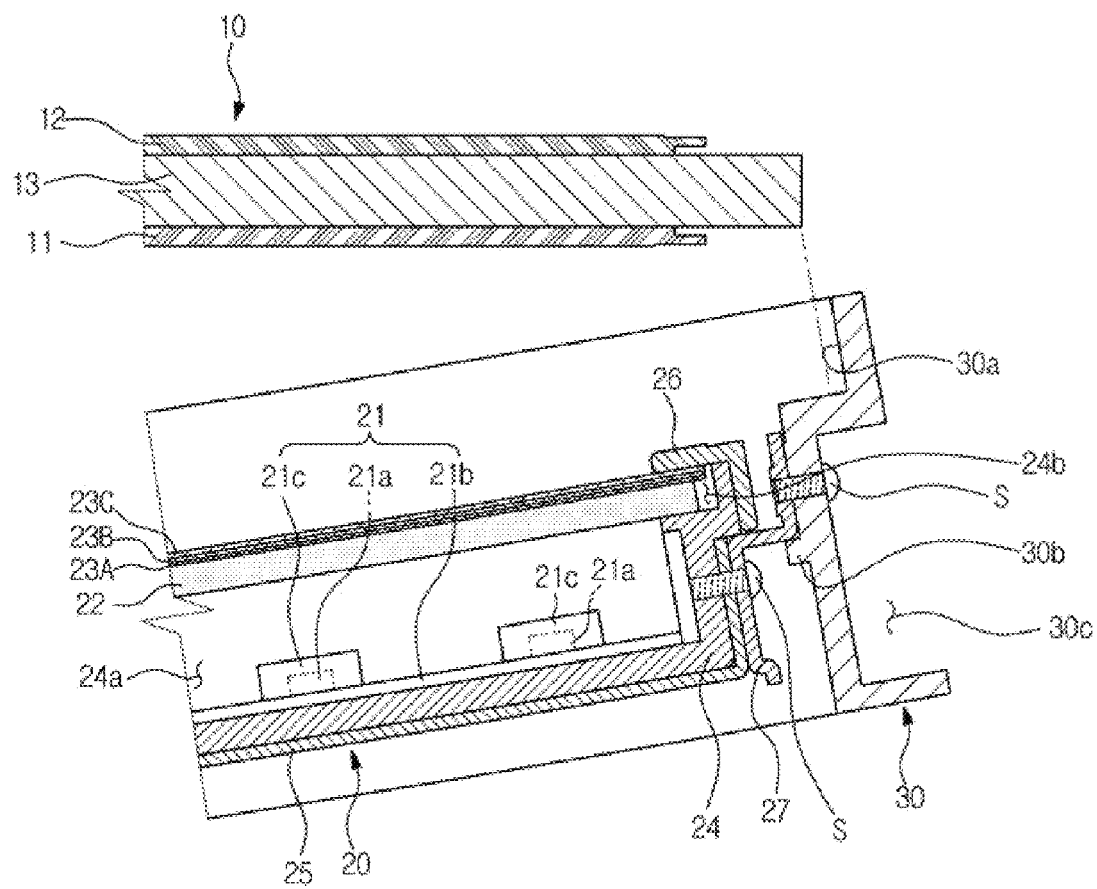
FIG. 6 is a cross-sectional diagram illustrating a method in which a display module is installed in a main frame of a 3D display apparatus, according to an exemplary embodiment.
Figure 7:
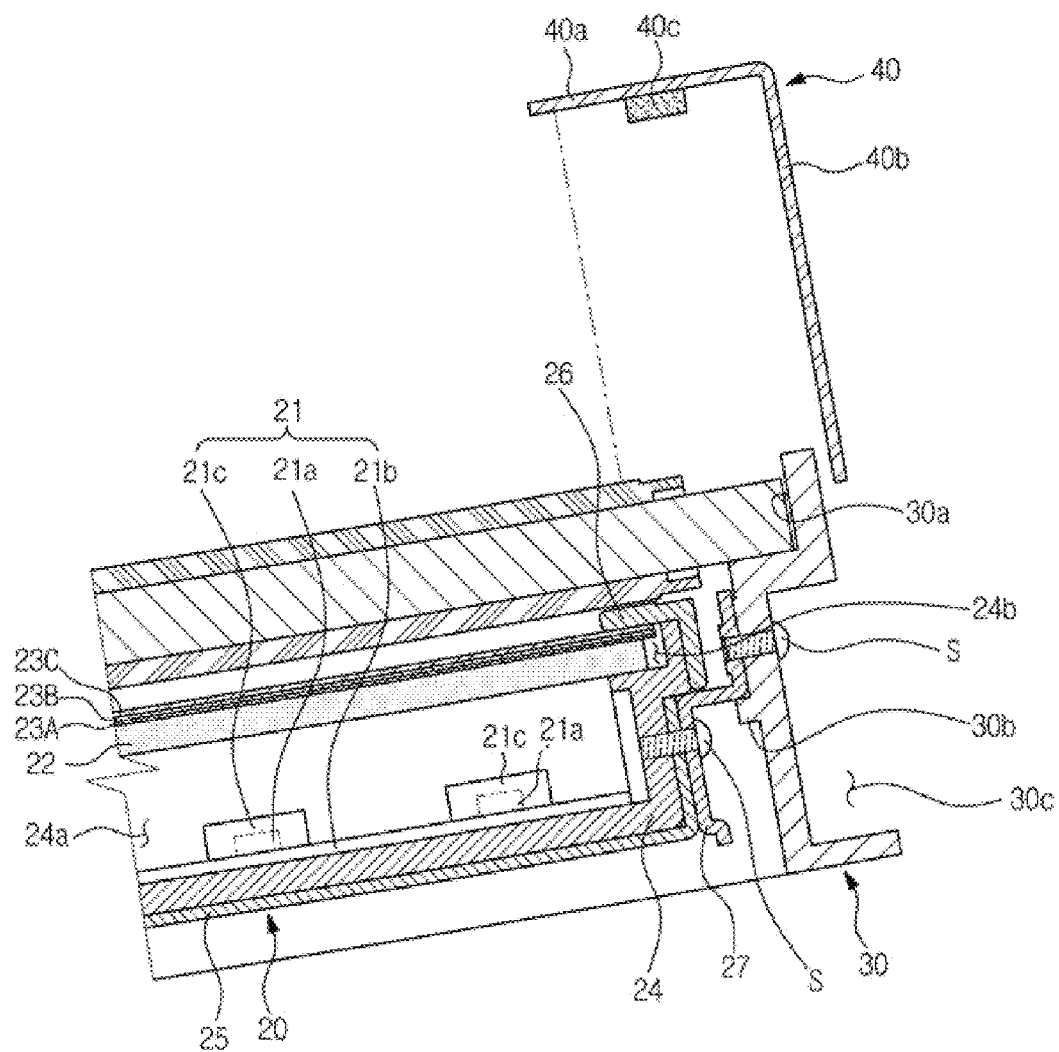
FIG. 7 is a cross-sectional diagram illustrating a method in which a case is installed in a main frame of a 3D display apparatus according to an exemplary embodiment.

FIG. 6 is a cross-sectional diagram illustrating a method in which a display module is installed in a main frame of a 3D display apparatus, according to an exemplary embodiment.

Referring to FIG. 6, the backlight module 20 may be installed at the back of the main frame 30. For example, the backlight module 20 may be installed by inserting the backlight module 20 into the main frame 30, causing the installation bracket 27 installed on the outer surface of the backlight module 20 to be caught by the catching jaw 30b that is formed at the back of the inner side of the main frame 30, and causing the installation bracket 27 to be fixed to the main frame 30 through the coupling member 'S' such as a screw.

Successively, the display module 10 may be installed in the main frame 30 in which the backlight module 20 is installed. For example, the display module 10 may be installed by causing edges of the spacing panel 13 that protrude from the spacing panel 13 while the spacing panel 13 is between the first display panel 11 and the second display panel 12 to be rested in and supported by the resting groove 30a that is formed at the front of the inner side of the main frame 30 that is curved.

By causing the spacing panel 13 to come to rest in the resting groove 30a of the curved main frame 30, the spacing panel 13 may be bent and curved such that both of its sides protrude forward in a curved manner, and the first display panel 11 and the second display panel 12 attached on the spacing panel 13 may also be curved according to the bending of the spacing panel 13.

According to one or more exemplary embodiments, the spacing panel 13 may have a uniform thickness and may be made of a single material that is bent at a constant curvature throughout the entire area of the spacing panel 13, as described herein. Accordingly, the first display panel 11 and the second display panel 12 may each receive a constant force through their entire areas from their surfaces contacting the spacing panel 13 causing the first display panel 11 and the second display panel 12 to be bent uniformly throughout the entire areas, corresponding to the bending of the spacing panel 13.

In some examples, after the display module 10 is installed, the case 40 may be installed on the main frame 30 such that the bezel part 40a of the case 40 covers the edges of the display module 10, and the side part 40b of the case 40 covers all four sides of the main frame 30.

In this example, the elastic member 40c may be attached on the inner side of the bezel part 40a of the case 40. Accordingly, the front edges of the spacing panel 13 may be supported by the elastic member 40c such that the spacing panel 13 may be maintained in the bent state (i.e. curved).

According to one or more exemplary embodiments, because the less rigid first display panel 11 and the second display panel 12 are attached to the more rigid spacing panel 13, when the spacing panel 13 is bent, the first display panel 11 and the second display panel 12 may be correspondingly bent uniformly throughout their entire areas, just like the spacing panel 13 without the first and second display panels 11 and 12 being touched or contacted by an external force.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring a processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

Although exemplary embodiments of the present disclosure have been shown and described, it should be appreciated by those skilled in the art that changes may be made in these exemplary embodiments without departing from the principles and spirit of the disclosure, the scope of which is defined in the claims and their equivalents.

What is claimed is:

1. A three-dimensional (3D) display apparatus comprising:
 a display module comprising:
  a first display panel configured to display a first two-dimensional (2D) image,
  a second display panel disposed in front of and spaced apart from the first display panel, and configured to display a second 2D image that when combined with the first 2D image displayed by the first display panel generates a 3D image,
  a spacing panel comprising:
   a first surface on which the first display panel is attached; and
   a second surface on which the second display panel is attached, the spacing panel protruding from the first and second display panels,
  a main frame configured to support edges of the spacing panel protruding from the first and second display panels,
 wherein the spacing panel is configured to bend with the first display panel and the second display panel attached on the first surface and the second surface such that in response to the spacing panel bending, the first and second display panels are bent without the first and second display panels receiving external contact, and
 wherein the first display panel and the second display panel are spaced apart from the main frame in a direction along which the spacing panel extends.

2. The 3D display apparatus of claim 1, wherein the spacing panel provides a uniform thickness throughout an entire area between the first and second display panels.

3. The 3D display apparatus of claim 1, wherein the spacing panel comprises a single material.

4. The 3D display apparatus of claim 1, wherein the spacing panel comprises a transparent material.

5. The 3D display apparatus of claim 1, wherein the first display panel and the second display panel are liquid crystal display (LCD) panels.

6. The 3D display apparatus of claim 1, wherein
 the main frame is curved such that both sides of the main frame protrude forward.

7. The 3D display apparatus of claim 6, wherein the main frame comprises a resting groove formed in a front part of an inner side of the main frame and configured so that the edges of the spacing panel are rested in and supported by the resting groove.

8. The 3D display apparatus of claim 6, further comprising a case installed on the main frame and configured to cover the edges of the spacing panel and edges of the second display panel.

9. The 3D display apparatus of claim 8, wherein the case further comprises an elastic member disposed on the inner side of the case and configured to elastically support front edges of the spacing panel.

10. The 3D display apparatus of claim 1, further comprising a backlight module curved such that both sides of the backlight module protrude forward, and the backlight module is disposed behind the display module and is configured to supply light to the display module.

11. The 3D display apparatus of claim 10, wherein the backlight module comprises a light source, a diffuser plate disposed in front of the light source, a backlight frame configured to support the light source and the diffuser plate, a support bracket installed in the backlight frame and configured to support edges of the diffuser plate to fixedly install the diffuser plate in the backlight frame, and a rear chassis configured to cover a rear surface of the backlight frame.

12. The 3D display apparatus of claim 11, wherein the light source comprises a plurality of light emitting diodes (LEDs) and a substrate on which the plurality of LEDs are mounted.

13. A method of manufacturing a three-dimensional (3D) display apparatus, the method comprising:
attaching a first display panel to a rear surface of a spacing panel;
attaching a second display panel to a front surface of the spacing panel; and
bending the spacing panel on which the first display panel and the second display panel are attached without contacting the first and second display panels with an external force, so that the first display panel and the second display panel are bent according to the bending of the spacing panel,
wherein the spacing panel is provided between the first and second display panels and protrudes from the first and second display panels,
wherein the bending comprises bending the space panel in a manner such that protruding edges of the spacing panel are supported by a main frame, and
wherein the first display panel and the second display panel are spaced apart from the main frame in a direction along which the spacing panel extends.

14. The method of claim 13, wherein the bending further comprises bending the spacing panel by causing the main frame to be curved such that both sides of the main frame protrude forward in a curved manner.

15. The method of claim 14, further comprising installing a case in the main frame, wherein the case is curved such that both sides of the case protrude forward and edges of the spacing panel and edges of the second display panel are covered by the case.

16. The method of claim 14, further comprising installing an elastic member on an inner side of the case,
wherein the elastic member elastically supports front edges of the spacing panel while the case is installed on the main frame to maintain the spacing panel in a bent state.

17. A display module for a three-dimensional (3D) display apparatus, the display module comprising:
a spacing panel having a uniform thickness and configured to bend in response to an external force;
first and second display panels disposed on respective sides of the spacing panel and being spaced the uniform thickness apart, each of the first and second display panels configured to simultaneously display a two-dimensional (2D) image at a different respective angle to generate a three-dimensional (3D) image; and
a main frame configured to support edges of the spacing panel protruding from the first and second display panels,
wherein the spacing panel is provided between the first and second display panels and protrudes from the first and second display panels, and
wherein the first display panel and the second display panel are spaced apart from the main frame in a direction along which the spacing panel extends.

18. The display module of claim 17, wherein the first display panel is configured to display a 2D image of an object at a first angle; and
the second display panel is configured to simultaneously display a second 2D image of the object at a second angle, to generate a 3D image of the object, and
wherein the first and second display panels are configured to bend an amount corresponding to the bending of the spacing panel, based only on the external force received by the spacing panel.

19. The display module of claim 17, wherein the spacing panel is larger than the first and second display panels and comprises protruding edges configured to receive an external force causing the spacing panel to bend.

* * * * *